Nov. 22, 1932.   B. PEPPERDINE   1,888,885
METHOD OF MAKING TOOL HANDLES
Filed May 21, 1932   2 Sheets-Sheet 1
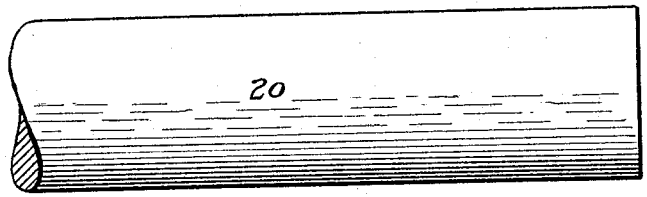
Fig.1
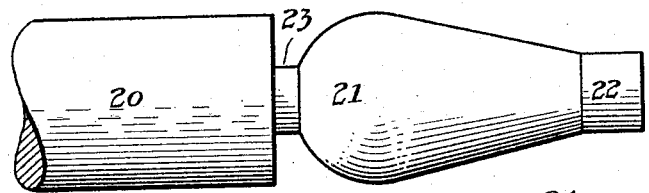
Fig.2
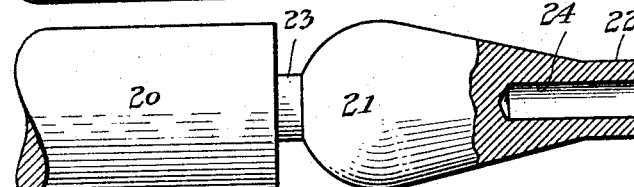
Fig.3
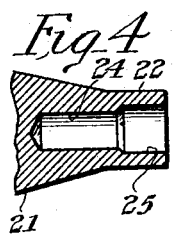
Fig.4
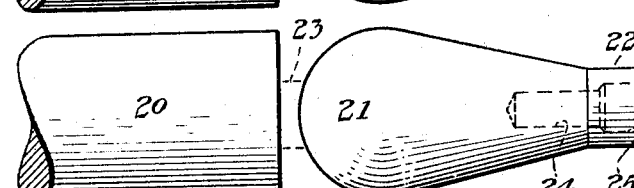
Fig.5
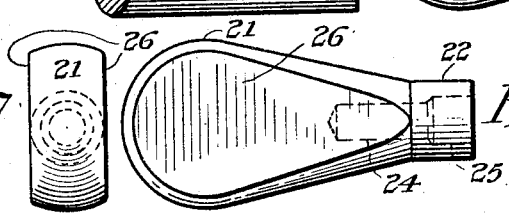
Fig.7   Fig.6
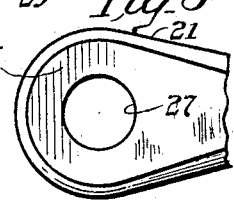
Fig.8
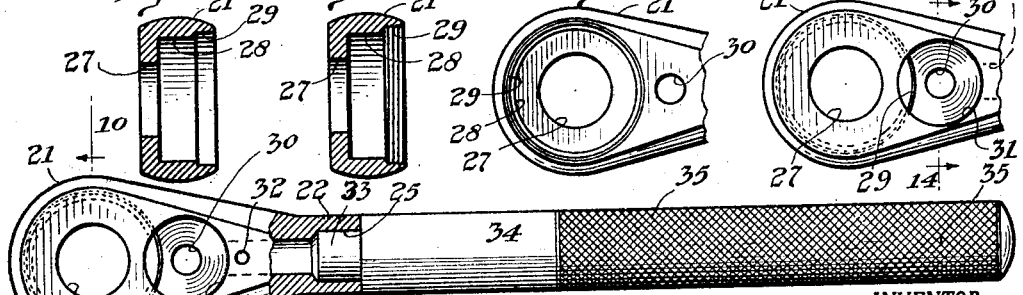
Fig.9   Fig.10   Fig.11   Fig.12
Fig.13
Fig.14
INVENTOR.
Ben Pepperdine
BY
Brayton Richards
ATTORNEY.

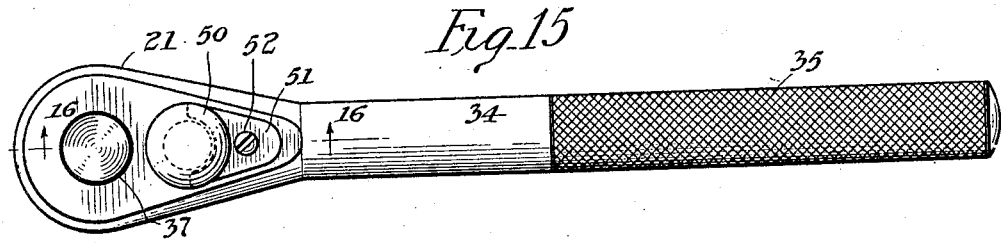
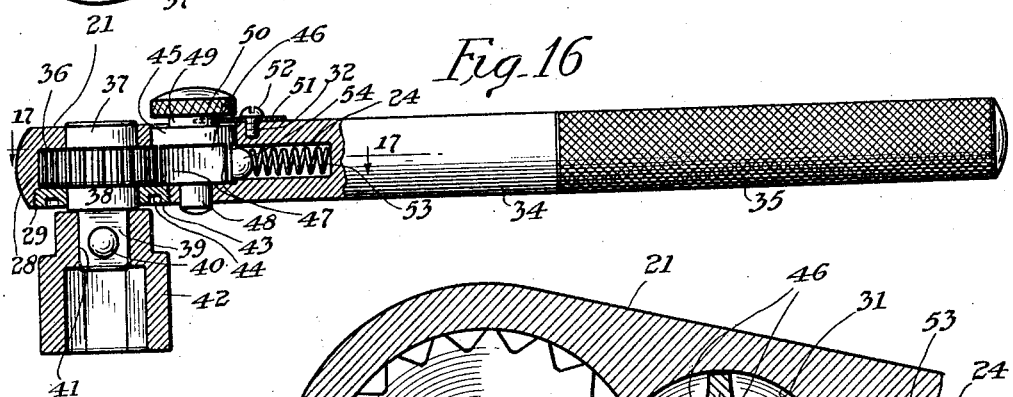
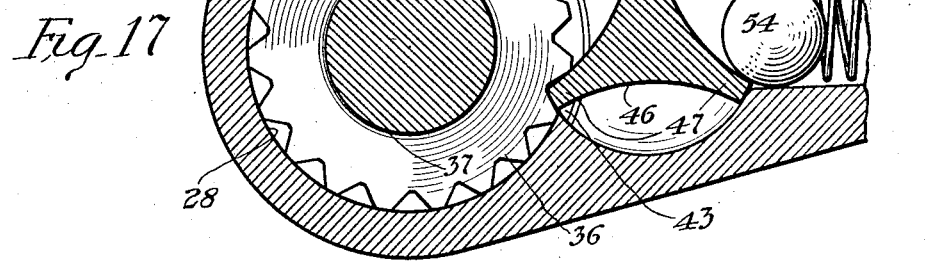
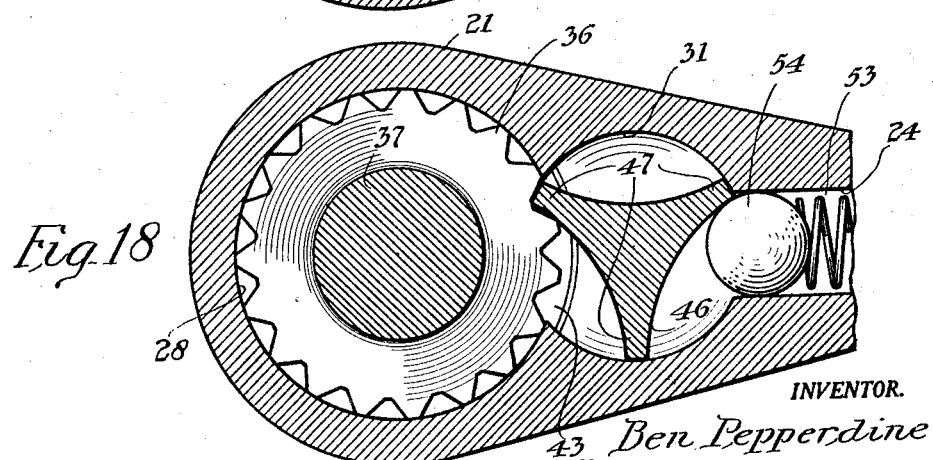

Patented Nov. 22, 1932

1,888,885

UNITED STATES PATENT OFFICE

BEN PEPPERDINE, OF CHICAGO, ILLINOIS

METHOD OF MAKING TOOL HANDLES

Application filed May 21, 1932. Serial No. 612,769.

The invention relates to improvements in and methods of making tool handles and has for its primary object the provision of an improved tool handle of the character indicated, which is capable of economical manufacture and highly efficient in use.

Another object of the invention is the provision of an improved method of manufacturing tool handles of the character indicated, by means of which highly efficient and ornamental handles of the character indicated may be economically produced.

Other objects will appear hereinafter.

The invention consists in the combinations and arrangements of parts and the methods hereinafter described and claimed.

The invention will be best understood by reference to the accompanying drawings forming a part of this specification, and in which:

Fig. 1 is a side view of a section of rod employed in making the head portion of the tool handle;

Fig. 2 is a similar view showing the condition of the end of the rod after the performance of the first cutting operation thereon;

Fig. 3, a similar view showing the condition of the end of the rod after the performance of the second operation thereon;

Fig. 4, a detail view showing the condition of the end of the rod after the performance of the third operation thereon;

Fig. 5, a view showing the condition of the rod and tool head as and when severed from each other;

Fig. 6, a side view of the head after it has been flattened on opposite sides;

Fig. 7, an end view of the head corresponding with Fig. 6;

Fig. 8, a partial side view of the head after a transverse bearing opening has been formed therein;

Fig. 9, a section of the head after one end of said bearing opening has been enlarged to form a bearing socket and an annular nut receiving socket;

Fig. 10, a view similar to Fig. 9 and taken substantially on line 10—10 of Fig. 13 showing the annular nut receiving socket threaded for the reception of said nut;

Fig. 11, a view of the head after an additional transverse bearing opening has been formed therein;

Fig. 12, a view of the head showing the opposite side of the head from that shown in Fig. 11 and after a second bearing socket has been formed therein;

Fig. 13, a side view of the completed head shown partially in section;

Fig. 14, a section of the completed head taken substantially on line 14—14 of Fig. 12;

Fig. 15, a side view of the completed tool after the tool elements have been mounted in the tool handle;

Fig. 16, a section taken substantially on line 16—16 of Fig. 15;

Fig. 17, an enlarged section taken substantially on line 17—17 of Fig. 16; and

Fig. 18, a view similar to Fig. 17 but showing the ratchet pawl in its other operative position.

In carrying on the improved method for production of the tool handle, a section 20 of steel rod of a diameter equal to or slightly greater than the desired diameter of the head of the tool handle, is mounted in a screw machine or similar element for revolving the same. A suitable tool is then applied to the side of the end of the rod 20, cutting and forming the same into the form shown in Fig. 2, in which the substantially hemispherical head 21 is formed as shown, and a cylindrical stem 22 is formed at the extreme end of the rod, the peripheries of the head and stem being connected as shown by substantially conical surface, and the whole retained in connection with the body of the rod 20 by means of a narrow neck or stem portion 23. Then a socket opening 24 is bored centrally in the end of the stem 22 and extending into the body of the head 21, as shown in Fig. 3. Then the outer end of the socket 24 is enlarged to form a plug receiving socket 25, as shown in Fig. 4. Then a suitable tool is applied to remove the neck 23, thereby severing the head from the body of the rod 20 and completing the hemispherical form of said head, as indicated in Fig. 5.

The head thus produced is then flattened on opposite sides 26 by passing the same through a double milling machine or other suitable machine whereby the opposite sides are flattened, as indicated in Figs. 6 and 7.

Transverse bearing sockets are then formed in the tool handle head. To this end, a hole 27, indicated in Fig. 8, may be first bored transversely through the head concentrically with the curved end thereof. The hole 27 is enlarged to form a cylindrical socket 28 and a cylindrical annular nut receiving socket 29, as best shown in Fig. 9, the socket 29 being internally threaded as shown in Fig. 10. Another transverse opening 30 is bored in the head in proximity to the socket 28 and said opening enlarged to form the socket 31 extending into the head from the side opposite to the open end of the socket 28 and the socket 31 being of a diameter to intersect the socket 28, as best shown in Fig. 12. A threaded retaining screw hole 32 is formed in the head adjacent the socket 31, as shown.

A plug 33 is snugly fitted and driven into the socket 25 thereby forming a solid flush end to the stem 22 and the handle shank 34 is butt welded as indicated in Fig. 13 to the end of the stem 22, thus completing the handle member for the reception of the tool elements. The extreme end of the shank 34 is preferably knurled as at 35 to form a better hand grip thereon.

By means of the method disclosed, a tool handle member of strong, durable, efficient and ornamental appearance may be readily and economically constructed, largely of screw machine operations.

The tool elements shown as mounted in the tool handle thus produced, comprise a double-acting ratchet wheel 36 of a diameter to fit loosely within the socket 28 and is provided at one side with an integral trunnion or boss 37 adapted to fit the bearing opening 27 at the bottom of the socket 28. The ratchet wheel 36 is provided on its upper side with a corresponding and similar trunnion or boss 38 and beyond that with an integral square wrench head 39, as shown. The wrench head 39 is properly provided on one side with a yieldingly retaining spring-held pawl 40 adapted and arranged to yieldingly retain the same in a socket 41 of a socket wrench head 42, as indicated, and whereby a readily detachable connection between the socket wrench head 42 and the wrench head 39 is afforded.

The ratchet wheel 36 is retained in the socket 28 by means of an annular securing nut 43 threaded into the socket 29 and provided with pin holes 44 for engagement by a spider wrench or similar tool for tightening or loosening said nut. By this arrangement, a strong, durable and highly efficient mounting is provided for the ratchet wheel 36 and the wrench head 39.

An oscillatory pawl member is mounted in the socket 31 in co-operative relationship with the ratchet wheel 36, said pawl member being preferably formed from a section of cylindrical rod and provided with a bearing surface or collar 45 snugly fitting the socket 31. Adjacent the bearing collar 45, the pawl member is provided with three recesses 46, best shown in Figs. 17 and 18, said recesses being preferably cut on a milling machine as shown and forming the body of a pawl into substantially triangular form with three equally spaced apices 47. At its lower end, the pawl member is provided with a trunnion or cylindrical boss 48 fitting the bearing opening 30, thereby providing a complete and balanced mounting for the pawl. At its upper end, the pawl member is provided with an annular groove 49 and a knurled operating head 50, the groove 49 receiving a bifurcated retaining plate 51 held in place by a retaining screw 52, as shown. A compression spring 53 is arranged in the socket 24 and a yieldable retaining ball 54 is arranged in said socket in co-operative relationship with one of the apices 47 of the triangular pawl member as best shown in Figs. 17 and 18. The arrangement is such that one of the other apices 47 is always in co-operative spring-held pawl engagement with the ratchet wheel 36, as shown, being yieldingly held in such relationship by the action of the ball 54. As indicated in Fig. 17, this relationship is such that the ratchet wheel 36 and the wrench head 39 will thus be held from rotation in one direction but rotation in the other direction permitted, thereby forming the tool into a ratchet wrench for turning socket wrenches in one direction, as will be readily understood by those skilled in this art. If desired, the pawl member may be rocked by means of the operating head 50 to throw the other adjacent apex 47 into co-operative relationship with the ratchet wheel 36, as indicated in Fig. 18, the ball 54 yielding into the socket 24 to permit of such adjustment and retaining the pawl member in such co-operative relationship. Obviously, by so adjusting the pawl member, the mechanism is so shifted as to permit of rotation of the wrench head 39 in the opposite direction, thereby permitting use of the tool for rotating the socket 42 in either direction as and when desired.

By this arrangement, a simple and effective double-acting ratchet tool or wrench which is strong, durable and highly efficient in use may be economically produced. The various co-operating parts of the tool elements are largely such as to be capable of being made in whole or in part on an automatic screw machine and are, therefore, capable of accurate and economical production. The specific form and arrangement of parts disclosed will be found to be a simple and effective one for the purpose.

While I have illustrated and described the preferred method of procedure and form of construction for carrying the invention into effect, these are capable of variation and modification without departing from the spirit of the invention. I, therefore, do not wish to be limited to the precise details of construction set forth but desire to avail myself of such variations and modifications as come within the scope of the appended claims.

I claim:

1. The method of making tool handles of the class described, consisting in first revolving and cutting a suitable body to form a substantially hemispherical head and stem; and then flattening opposite sides of said head and welding a handle shank to said stem.

2. The method of making tool handles of the class described, consisting in first revolving and cutting a suitable body to form a substantially hemispherical head at its inner end and a stem at its outer end; then boring a socket into the end of said stem extending into said head; then enlarging the outer end of said socket to form a plug socket; and then flattening opposite sides of said head, inserting a plug in said plug socket and welding a handle shank to said stem.

3. The method of making tool handles of the class described, consisting in first revolving and cutting a suitable body to form a substantially hemispherical head and stem; then flattening opposite sides of said head and welding a handle shank to said stem; and then forming one or more bearings for tool elements in said head.

4. The method of making tool handles of the class described, consisting in first revolving and cutting a suitable body to form a substantially hemispherical head at its inner end and a stem at its outer end; then boring a socket into the end of said stem extending into said head; then enlarging the outer end of said socket to form a plug socket; then flattening opposite sides of said head, inserting a plug in said plug socket and welding a handle shank to said stem; and then forming one or more bearings for tool elements in said head.

5. The method of making tool handles of the class described, consisting in first revolving and cutting a suitable body to form a substantially hemispherical head and stem; then flattening opposite sides of said head and welding a handle shank to said stem; and then forming transverse bearing sockets in opposite sides of said head.

6. The method of making tool handles of the class described, consisting in first revolving and cutting a suitable body to form a substantially hemispherical head at its inner end and a stem at its outer end; then boring a socket into the end of said stem extending into said head; then enlarging the outer end of said socket to form a plug socket; then flattening opposite sides of said head, inserting a plug in said plug socket and welding a handle shank to said stem; and then forming transverse bearing sockets in opposite sides of said head.

7. The method of making tool handles of the class described, consisting in first revolving and cutting a suitable body to form a substantially hemispherical head and stem; then flattening opposite sides of said head and welding a handle shank to said stem; and then forming transverse bearing sockets in opposite sides of said head in intersecting, co-operative relationship.

8. The method of making tool handles of the class described, consisting in first revolving and cutting a suitable body to form a substantially hemispherical head at its inner end and a stem at its outer end; then boring a socket into the end of said stem extending into said head; then enlarging the outer end of said socket to form a plug socket; then flattening opposite sides of said head, inserting a plug in said plug socket and welding a handle shank to said stem; and then forming transverse bearing sockets in opposite sides of said head in intersecting, co-operative relationship.

9. The method of making tool handles of the class described, consisting in first revolving a rod and cutting said rod to form a substantially hemispherical head at its inner end and a cylindrical stem at its outer end, the peripheries of said head and stem being joined by means of a substantially conical surface; then boring a socket into the end of said stem extending into said head; then enlarging the outer end of said socket forming a plug socket; then flattening opposite sides of said head, inserting a plug in said plug socket and welding a handle shank to said stem; and then forming two transverse, cylindrical bearing sockets in opposite sides of said head in intersecting, co-operative relationship with the bottom of each socket provided with a concentric bearing opening, the open end of one of said sockets being provided with a threaded enlargement for the reception of an annular securing nut.

In witness that I claim the foregoing as my invention, I affix my signature this 17th day of May, 1932.

BEN PEPPERDINE.